Aug. 31, 1943.  M. HATTAN  2,328,013
END FITTING FOR HIGH PRESSURE HOSE
Filed Dec. 8, 1941
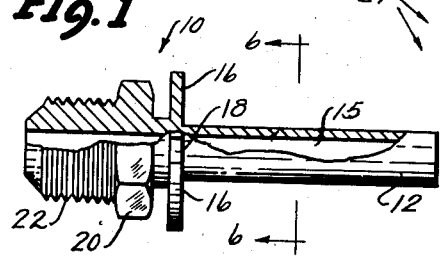
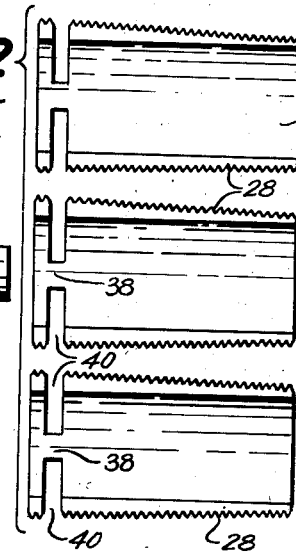
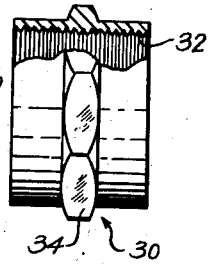
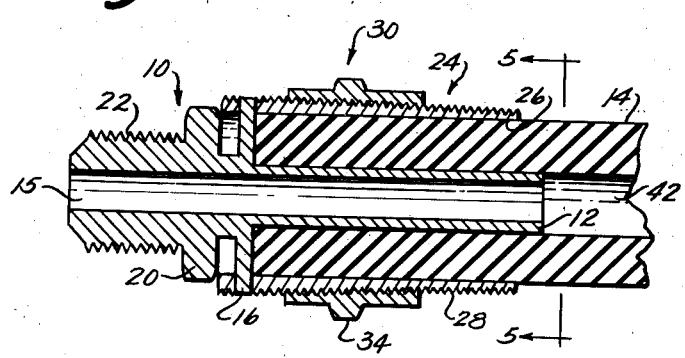
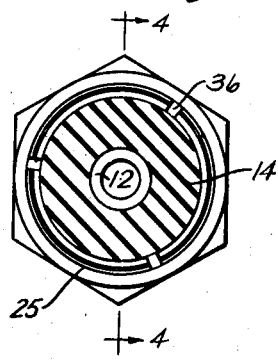
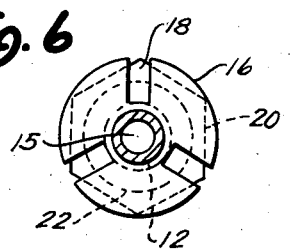
INVENTOR
MARK HATTAN
ATTORNEYS Patented Aug. 31, 1943

2,328,013

UNITED STATES PATENT OFFICE 2,328,013

END FITTING FOR HIGH PRESSURE HOSE

Mark Hattan, Dayton, Ohio

Application December 8, 1941, Serial No. 422,095

3 Claims. (Cl. 285—82)

(Granted under the act of March 3, 1883, as amended April 30, 1928; 370 O. G. 757)

The invention described herein may be manufactured and used by or for Government for governmental purposes, without the payment to me of any royalty thereon.

This invention relates to hose fittings, and particularly to the end fittings of high-pressure hose section.

An object of the invention is to provide an end fitting of this character which will be as short as possible, in order that as little of the hose section as possible will be rigid.

Another object of the invention is to provide a fitting of this kind which will have greater capacity for gripping the hose ends in order that leakage and blowouts may be minimized.

Another object is to provide an end fitting of this character which may be readily removed from worn hose and used again on new.

Another object is to provide, in a fitting of this kind, gripping means of unusual force between the fitting and the hose, in order that the gripping surfaces on the fitting need not be corregated or knurled and the hose may have a smooth exterior without the necessity of a fabric cover molded to the outside, to the end that the hose surfaces contacted by the fitting will not be chafed or torn should the fitting inadvertently be insufficiently tightened and a blowout, for that reason, occur.

Other objects will become apparent as the invention is more specifically described and as reference is made to the drawing, wherein:

Fig. 1 is a side view, partly in section, of the body of the improved fitting.

Fig. 2 shows the clamping sleeve after it has been divided by axially extending cuts into three segmental parts.

Fig. 3 is a side view of the clamping nut, a portion being shown in section.

Fig. 4 is a sectional assembly view of the parts shown in detail in Figs. 1, 2, and 3, the view being taken on the line 4—4 of Fig. 5.

Fig. 5 is a transverse sectional view taken on the line 5—5 of Fig. 4.

Fig. 6 is a transverse sectional view taken through the body on the line 6—6 of Fig. 1.

Like numerals refer to like parts throughout the views.

The body 10 of the device, shown in detail in Fig. 1, comprises a tubular portion 12 which fits closely into the interior of the hose 14. An opening 15 extends axially through the body 10.

A flange 16 is preferably made integral with the body and provided with a plurality of radial guide notches 18, there being three of these notches in the present embodiment. The sides of the guide notches 18 are parallel, as best shown in Fig. 6.

Axially spaced apart from the flange 16 is a polygonal portion 20, also integral with the body 10 and hexagonal in the present embodiment. Portion 20 is provided as a holding means for holding the body 10 non-rotative by means of a wrench or similar tool when the hose and the fitting are being assembled.

The threaded portion 22 of the body 10 is preferably integral therewith and may be externally threaded as shown, or internally threaded if so required, the threads being of a pitch and the diameter a size to fit the threads of the part with which it will be used.

A sleeve 24 has a bore 26 which fits closely over the outside of the hose, while the external diameter is tapered, increasing in diameter from the right end to the left. The tapered outside of the sleeve is threaded as at 28 to receive the clamp nut 30 which is internally threaded at 32 to fit the taper-threaded outside of the sleeve. The exterior of the clamp nut 30 is provided with a polygonal portion 34 to which a wrench may be applied in tightening the nut.

The sleeve 24 is divided by one or more axially extending cuts 36, Fig. 5, three cuts being employed in the present embodiment. The purpose of so dividing the sleeve is that the sleeve may be drawn to a smaller diameter as the nut 30 advances from right to left over the tapered threads 28.

The number of the longitudinal cuts 36 which are made through the sleeve 24 determines, of course, the number of separate parts 25 into which the sleeve is divided, and this governs the number of radial guide notches 18 which should be put in the flange 16. Since, in the present embodiment, the notches 18 are three in number, the sleeve 24 is divided into three segments.

After the sleeve 24 is divided into three segments, as shown in Fig. 2, the segments are provided at the thicker or left-hand ends with radial guide pieces 38 which have parallel sides and fit slidably into the radial guide notches 18, whereby the guiding means 18 and 38 act as a key and keyway connection for preventing relative rotation between the body 10 and sleeve 24.

The parallel-sided guide pieces 38 are provided by cutting lateral grooves 40 into the segments, the grooves being wide enough to fit slidably over the thickness of the flange 16, and the depth of the grooves being so governed as to leave just the right amount of stock for the guide pieces 38 at the bottoms of a pair of grooves 40.

To assemble the improved end fitting with a hose, the tubular portion 12 of the body 10 is pushed into the bore 42 of the hose 14 until the end of the hose is against the flange 16. Segments 25 are then laid around the outside of the hose, with the guide pieces 38 of the segments in the guide notches 18 of the flange. The nut 30 should then be screwed over the segments 25 of the sleeve 24 until its advance over the taper has imposed the clamping force needed to hold the parts together tightly enough for the pressure desired.

The outside diameter of the flange 16 should preferably be no greater than the inside diameter of the nut 30 in order that, when necessary to provide the desired grip, the nut may be drawn up until its forward end has passed over the flange. Observance of this matter will provide the maximum range of adjustment.

In the single exemplification of the invention shown, the parts 12, 16, 20 and 22 are integral, but obviously they may be made separately and brazed, welded, or otherwise secured together. Parts 20 and 34 are shown as being polygonal, but they may be round and provided with spanner wrench slots within the spirit of the invention, and while the slots 18 and guide pieces 38 are indicated as radial, any shape which will guide the segments 25 for radial movement is considered within the scope of the claims, an important feature being that the guides 18—38 also prevent relative rotation in the assembled device, between the body 10 and the segmental sleeve 24.

Having described the invention, I claim:

1. For use on a high pressure hose, an end fitting comprising a clamping sleeve having a substantially straight inner bore substantially equal to the outside diameter of the hose, and having a taper-threaded outer diameter, an internally taper-threaded nut on the outside of said sleeve, said sleeve being divided by longitudinal spaces into segments, a body having a coupling connection at one end, a holding portion fast on said body axially adjacent said coupling connection, a tubular portion dimensioned to fit closely into the inside of said hose, and a flange non-rotatably fastened to said body intermediate said holding portion and said tubular portion, said flange having circumferentially spaced slots extending axially therethrough equal in number to the number of segments, and guiding means on each segment, each segment guiding means consisting of a guide piece slidable toward and away from said body in one of said slots and a portion slotted to fit slidably over said flange.

2. For use on a high pressure hose, an end fitting comprising a clamping sleeve having a substantially straight inner bore substantially equal to the outside of the hose and having a taper-threaded outer diameter, an internally taper-threaded nut on the outside of said sleeve, said sleeve being divided by longitudinal spaces into segments, a body having a coupling connection at one end, a holding portion for a wrench fast on said body axially adjacent said coupling connection, a tubular portion dimensioned to fit closely into the inside of said hose, and circumferentially spaced guide means equal to the number of segments fast on said body extending outwardly from the body between said tubular portion and said holding portion, and guide pieces on said segments slidable between said circumferentially spaced guide means toward and away from said body.

3. For use on a high pressure hose, an end fitting comprising a clamping sleeve having a straight inner bore substantially equal to the outside of the hose and having a taper-threaded outer diameter, an internally taper-threaded nut on the outside of said sleeve, said sleeve being divided by longitudinal spaces into segments, a body having a coupling connection at one end, a holding portion fast on said body axially adjacent said coupling connection, a tubular portion dimensioned to fit closely into the inside of said hose, and circumferentially spaced outwardly extending guiding means equal to the number of segments non-rotatably carried by said body intermediate said tubular portion and said holding portion, and segment guiding means, one carried by each segment slidably engaging said first said guiding means for movement of the segments toward and away from said body.

MARK HATTAN.